United States Patent [19]

Swail

[11] Patent Number: 5,630,224

[45] Date of Patent: May 13, 1997

[54] METHOD AND APPARATUS FOR AVOIDING DESENSITIZATION OF A RADIO FREQUENCY RECEIVER

[75] Inventor: Bruce D. Swail, Woodinville, Wash.

[73] Assignee: Motorola, Inc., Schaumburg, Ill.

[21] Appl. No.: 366,360

[22] Filed: Dec. 29, 1994

[51] Int. Cl.$^6$ .................................................. H04B 1/10
[52] U.S. Cl. ........................ 455/296; 455/343; 455/302
[58] Field of Search ................................ 455/296, 302, 455/310, 311, 312, 343, 38.1, 38.2, 38.3, 228; 340/825.44, 311.1

[56] References Cited

U.S. PATENT DOCUMENTS

| | | | |
|---|---|---|---|
| 4,383,257 | 5/1983 | Giallanza et al. | 340/825.47 |
| 4,437,095 | 3/1984 | Akahori et al. | 455/38.1 |
| 4,879,758 | 11/1989 | DeLuca et al. | 455/296 |
| 5,008,955 | 4/1991 | Sato et al. | 455/181 |
| 5,058,203 | 10/1991 | Inagami | 455/343 |
| 5,142,699 | 8/1992 | Sato et al. | 455/343 |
| 5,187,471 | 2/1993 | Wagai et al. | 455/343 |
| 5,249,233 | 9/1993 | Kennedy et al. | 455/311 |
| 5,274,843 | 12/1993 | Murai et al. | 455/38 |
| 5,376,975 | 12/1994 | Romero et al. | 340/825.44 |
| 5,392,023 | 2/1995 | D'Avelllo et al. | 455/343 |
| 5,430,894 | 7/1995 | Nohara et al. | 455/296 |
| 5,437,060 | 7/1995 | Delamater et al. | 455/296 |
| 5,438,696 | 8/1995 | Napoles et al. | 455/343 |
| 5,438,701 | 8/1995 | Yamada et al. | 455/89 |
| 5,448,774 | 9/1995 | Yokozaki et al. | 455/343 |
| 5,471,660 | 11/1995 | Masaki et al. | 455/161.2 |
| 5,471,663 | 11/1995 | Davis | 455/296 |
| 5,519,506 | 5/1996 | D'Avello et al. | 455/343 |
| 5,524,021 | 6/1996 | Scotton et al. | 455/343 |

FOREIGN PATENT DOCUMENTS

91/11889  8/1991  WIPO .

*Primary Examiner*—Reinhard J. Eisenzopf
*Assistant Examiner*—Marsha D. Banks-Harold
*Attorney, Agent, or Firm*—Charles W. Bethards

[57] ABSTRACT

A subscriber terminal (104) operable in a wireless communications system (100) having an infrastructure (111) and arranged and constructed to provide data communications between the infrastructure and the subscriber terminal, includes a radio frequency receiver (201) arranged to receive communications from the infrastructure during an active time period (303); and a portable computing device (105) operatively coupled to the radio frequency transceiver and arranged to forego a desense generating activity during the active period. A corresponding method includes determining an active time period for the RF receiver (403); directing the computer to forego desense generating activities (405) during the active time period; and activating the RF receiver (407) during the active time period.

20 Claims, 3 Drawing Sheets

METHOD AND APPARATUS FOR AVOIDING DESENSITIZATION OF A RADIO FREQUENCY RECEIVER

FIELD OF THE INVENTION

The present disclosure deals with communications receivers and more particularly but not limited to a method and apparatus for avoiding desensitization of a radio frequency receivers.

BACKGROUND OF THE INVENTION

Subscriber terminals, such as personal digital assistants and other types of portable computers using data radio transceivers are being used in a wide variety of applications. Such terminals may be used in a variety of circumstances such as requesting stock quotes, accessing data files or a central data processing center or immediate access to time sensitive information like E-mail messages. Examples of such subscriber terminals include various personal digital assistants (PDA) or palmtop computers developed by Motorola, Inc. Subscriber terminals such as these operate in conjunction with wireless telecommunications infrastructure equipment (i.e., the ARDIS infrastructure system operated by Motorola). The wireless infrastructure equipment typically includes stationary transceivers interconnected with a local telephone network or other data network or transfer facility.

Typically, upon receiving a request to transmit, a data transceiver transmits a request to send and then waits for authorization to send before transmitting or sending a data packet. In the case of receiving a data communications, a data transceiver ordinarily includes a call selective receiver for recognizing and receiving only calls directed to the target subscriber terminal.

As with any wireless system a signal directed to a subscriber terminal by way of a wireless data receiver may be blocked by a hill or other tall object that unduly attenuates the signal. Further, at some radio signal levels, noise generated within the computer portion of a subscriber terminal by clocking devices or switching power supplies may result in a signal to noise ratio of such a low level as to render the signal unintelligible. Past efforts directed to reducing internally generated noise sources have taught that shielding and physical isolation of significant noise sources from the receiver section are an effective means of improving the signal to noise ratio. Because of the importance and wide spread usage of subscriber terminals including portable computers and other portable digital systems a need exists for more effective techniques of suppressing the effects or desensitization of radio frequency receivers resulting from the noise generated within such devices.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
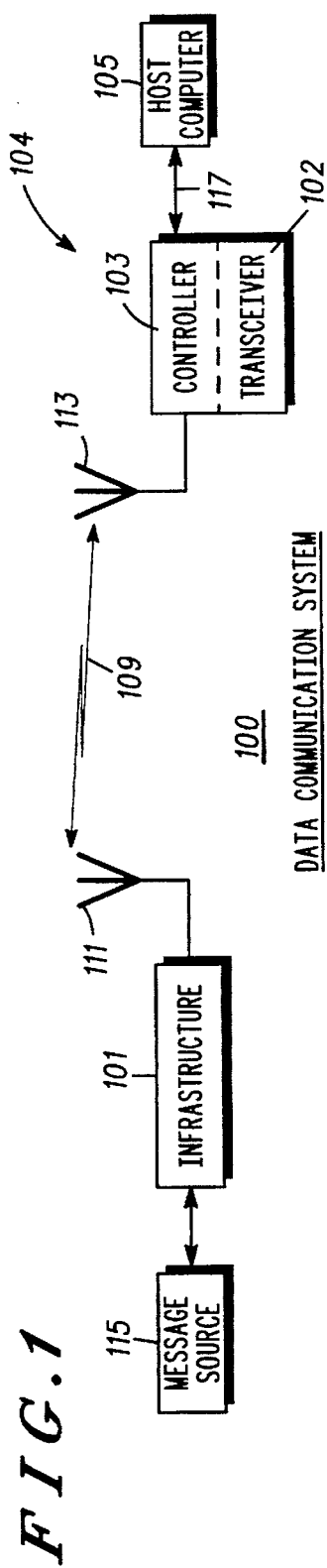
FIG. 1 is a representative diagram of a data communications system suitable for employing embodiments in accordance with the present invention.

Generally the present disclosure deals with techniques for avoiding desensitization of radio frequency receivers and more specifically such receivers that operate cooperatively and in close proximity to computers such as portable computers for the purposes of providing a subscriber terminal in a data communications system.

A preferred method embodiment is set in a wireless communications system having an infrastructure and subscriber terminals. The system is arranged and constructed to provide data communications between the infrastructure and the subscriber terminals. The subscriber terminals include a computer that is operatively coupled to a radio frequency (RF) receiver so as to provide, for example a convenient user interface to the communications system. This method of avoiding desensitization of the radio frequency receiver due to radio frequency energy generated by the computer includes the steps of determining an active time period for the RF receiver; directing the computer to forego desense generating activities during the active time period; and activating the RF receiver during the active time period.

Further method embodiments include a step of reactivating the computer after the active time period or during a subsequently determined inactive portion of the active time period. Determining an active time period may include utilizing a active portion or active cycle of a power save protocol or utilizing a prescribed time period after a transmission from the subscriber terminal. Directing the computer to forego desense generating activities may include disabling a power supply or a display or modifying a processor clock, in part or total, for the computer.

A corresponding apparatus embodiment is similarly set in a wireless communications system with an infrastructure and arranged and constructed to provide data communications between the infrastructure and subscriber terminals. A subscriber terminal includes a radio frequency receiver, preferably part of a transceiver, arranged to receive communications from the infrastructure during an active time period and a portable computing device operatively coupled to the radio frequency transceiver and arranged to forego a desense generating activity during the active time period.

The radio frequency transceiver further includes a controller for determining the active time period that may be, for example, an active portion of a power save protocol or a prescribed time period after a transmission from the subscriber terminal. The controller, preferably, provides an active signal to the portable computing device during the active time period and responsive thereto the portable computing device foregoes the desense generating activities. Foregoing such activities may include deactivating the portable computing device during the active time period and then reactivating it after the active time period or deactivation during only a subsequently determined active portion of the active time period and reactivation thereafter. The portable computing device may deactivate by disabling a power supply or a display or modifying a processor clock for at least a portion of said active time period.

The instant invention can be more fully described with reference to the figures in which FIG. 1 depicts a data communications system (100). The data communications system (100) includes a message source (115) such as a public switched telephone network, shown coupled to an infrastructure (101) that includes network controllers (not specifically shown). The infrastructure (101) includes a transceiver or base station coupled to an antenna (111) and operating to receive and transmit radio signals over a wireless radio channel (109). The radio signals are transmitted from or received by an antenna (113) that is coupled to a subscriber terminal (104) or more specifically a data transceiver (102) including a controller (103). The data transceiver (102), described more fully below, operates to convert radio signals into data messages and vice a versa in addition to establishing and maintaining the radio communications link with the infrastructure (101). The data messages are supplied to or received from a computer (105), referred to here alternatively as the portable computing device, host, or host terminal, at interface (117). While the instant discussion refers to a computer, etc. the inventive principles disclosed clearly extend to all situations where a radio transceiver operates in close proximity to a digital system that is prone to the generation of interfering noise capable of desensitization of a receiver. Thus computer or the alternatives above is specifically intended to encompass such digital systems. It should be noted that while FIG. 1 depicts only one radio channel, one modem, and one infrastructure antenna, a practical system may include a plurality of each. Generally the data communications system (100) is intended to supply specific messages to/from specific subscriber terminals in a largely transparent (to end users) fashion.

Figure 2:
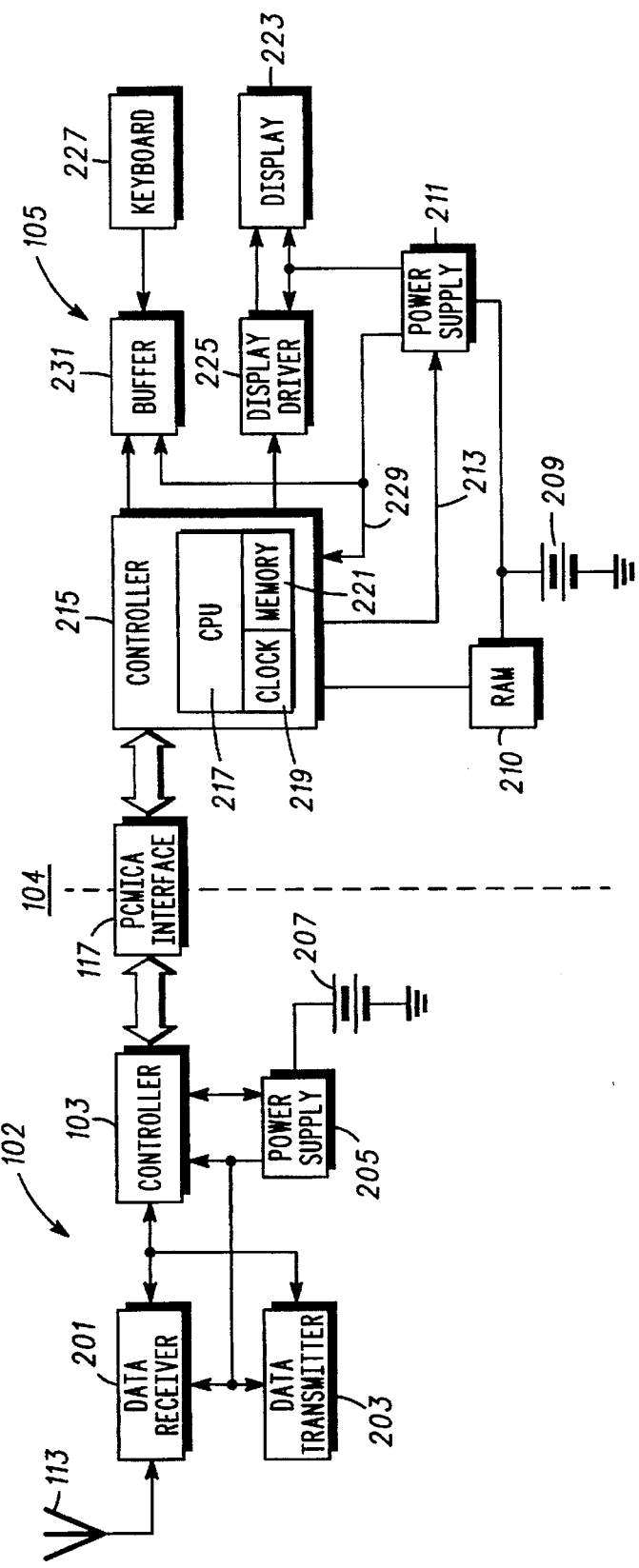
FIG. 2 is a block diagram of a subscriber terminal in accordance with the present invention.

Referring to the FIG. 2 block diagram of a subscriber terminal (104) wherein like reference numerals refer to like elements from FIG. 1, a more detailed description of the functions of the subscriber terminal will be undertaken. As depicted the subscriber terminal (104) includes the radio frequency transceiver (102) coupled to the computer (105), preferably, portable computing device at the interface (117). The interface (117) includes, preferably, an electrical interface, such as defined by the Personal Computer Memory Card International Association (PCMCIA) Card Interface Release 2.0 electrical standard, published by the Personal Computer Memory Card International Association, 1030B East Duane Avenue, Sunnyvale, Calif. Personal Computer Memory Card International Association.

The radio frequency transceiver includes a receiver or data receiver (201) and a transmitter or data transmitter (203) each coupled to the antenna (113) as well as controller (103) and a power supply (205). Generally the receiver, under control of the controller (103) receives radio frequency signals from the wireless channel (109) and converts these signals to digital information that is forwarded to the controller for decoding and overhead interpretation, etc. Similarly the transmitter, under control of the controller, receives digital information from the controller (103) and creates a radio frequency signal with the requisite modulation that is subsequently transmitted on the radio channel (109). The power supply (205), that may operate in a switching mode to produce the desired supply voltages for the radio frequency transceiver, is coupled to a battery (207), preferably a rechargeable battery such as a NICAD based unit, and provides power to the elements of the radio frequency transceiver again under control of the controller (103).

The controller (103) additionally handles communication between the transceiver (102) and the computer (105). Such communication may include delivering or receiving data messages or other control messages, respectively, to and from the computer. Under certain circumstances, such as where the communications system operates in accordance with a power save protocol, such as, Motorola's Radio Data Link Access Protocol (RDLAP) whereby specific subscriber terminals are active or required to be active only during an active time period the controller (103) will determine the active time period, direct via a control message the computer to forego desense generating activities during the active time period or portion thereof, and then activate the RF receiver during the active time period thus advantageously assuring that desensitization of the RF receiver does not occur.

The portable computing device or computer (105) includes a complementary portion of the interface (117), preferably PCMCIA interface, a battery (209), preferably rechargeable battery, and power supply (211) that operates in a switching mode to produce the desired supply voltages for the computer (105). The power supply (211) has a control input (213) allowing control of the power supply by a controller (215), such as a Motorola 68,000 series controller. Included within the controller (215) is a microprocessor (217) containing a real time clock (219), and memory (221) such as random access memory (RAM) and a read only memory (ROM).

Further included in the computer is a display device (223), such as a liquid crystal display (LCD), for providing a visual user interface for viewing information such a E-mail messages, or stock quotes retrieved from the communications system through the radio frequency transceiver (102). A display driver (225) provides control and switching circuits necessary for display of the viewed information.

A manual input module (227) (e.g., a keyboard, trackball, slate, etc.) is provided for the input of control commands and data. In the illustrated embodiment, the input module (227) is a keyboard. A buffer (231) or memory device is provided for buffering information from the input module. During normal operation, the controller (215) monitors for inputs from the input module (227) and from the radio frequency transceiver (102) or more specifically data messages received by the data receiver (201) and forwarded from the radio frequency transceiver's controller (103). The controller (215) also provides a display on the display device (223) of data and current data options.

The power supply (211), display driver (225), clock (219), and input module (227) elements discussed above and other peripheral devices such as a disk drive controller (not shown) are each potential sources of energy that may desense or contribute to desensitization of the radio frequency transceiver (102) or more specifically receiver (201). These sources of desensitization may be advantageously eliminated or controlled using various embodiments of the instant invention.

When an operator (not shown) of the subscriber terminal (104) wishes to send or retrieve data (i.e., E-mail messages), the operator may for example select an appropriate option through the input module (227) and display device (223), as is well known in the art. In response, the controller (215) composes an appropriate data message and sends the message to the radio frequency transceiver's controller (103) where it is forwarded to the infrastructure in accordance with the system's protocol by way of the transmitter (203) and antenna (113).

After a delay (i.e., 5 seconds) the infrastructure ordinarily will respond with an acknowledgment of the message received. The subscriber terminal (104) identifies responses directed to itself by decoding each packet header of each data packet transmission transmitted by the infrastructure during the periods of time when it is active or receiving. Where an identifier within a received header matches an identifier of the subscriber unit, the remainder of the data packet is stored, decoded, or otherwise processed. Other messages, where an identifier does not match the subscriber unit's identifier, are ignored or discarded.

Generally, for power save protocols a given subscriber unit will be active for something on the order of 10% or 12% of the time and in an inactive or sleep state for the balance of the time. The controller (103) will be charged with determining this active time period and assuring that the receiver (201) is powered up and available to receive any messages during the active time period.

In accordance with an embodiment of the invention, upon determining an active time period for the RF receiver (201) the controller (103) acts to reduce interfering noise or desensitization within the subscriber terminal and more particularly within the receiver (201) by causing deactivation of certain desense generating activities within the computer (105). Desense generating activities to be deactivated may include the power supply (211), display drivers (225), a serial clock, originating from within the controller (215), and used to shift data from the keyboard (227) into the controller (215), or the clock (219) or other switching devices that may generate desensitization.

Deactivation may take many forms but particularly must mitigate or reduce the generation of interfering noise or desensitization noise produced by the portable computing device that would otherwise occur. This would include disabling or turning off the switching portion or charging portion of the power supply (211) for brief periods of time or until it became all important to turn it on. The display or keyboard could similarly be disabled for brief periods of time with little or no noticeable degradation to an end user. The basic controller clock (219) could be modified, disabled or switched to a lower frequency operating mode, such as, if the computer were placed in a sleep or inactive mode of operation. By tasking advantage of a power save protocol wherein the receiver (201) is enabled for around 10% of the time the computer (105) under a worst case scenario would still be fully operational for something approaching 90% of the time.

A detailed discussion and exemplary approach for deactivating various of the interfering noise sources is included within co-pending and concurrently filed patent application Ser. No. 08/366,360, which application is assigned to the same assignee and is hereby incorporated by reference into the instant one. A review of that disclosure is provided here.

Control of the charging power supply (211) by the controller (215) is accomplished after system boot-up by sequentially and repetitively checking the output (229) from the power supply to determine if charging is required. If charging is required, then the controller (215) activates the power supply via control lead (213). Once charging begins, the controller (215) tests to determine whether charging is complete. When the controller determines that charging is complete, the controller deactivates charging via control lead (213). If charging is not complete, the controller tests to see if deactiivation is required to forego desense generating activities and if so deactivates the charging power supply (211) by for example, turning it off for the duration of an active time period.

Control of other peripheral devices (i.e., display (223), keyboard (229), etc. by the controller (215) is accomplished after system boot by first determining a set of threshold values for each peripheral. Threshold values for the peripherals may include such parameters as a maximum period of allowable deferred service and a maximum period since the last servicing of the peripheral. During normal operation the controller tests to see if servicing of a peripheral is required. If service is required, the controller begins to service the peripheral and further tests to see if deactivation is required to forego desense generating activities and if so then the controller suspends service to the peripheral by deactivating switching devices, such as the display driver (225) or buffer (231) responsible for providing service to the peripheral.

If the peripheral device deactivated is the display (223), then the controller simply stops sending switching commands to the display driver. Since the image on the display (223) would begin to fade after 150–200 ms, the time of deactivation must be limited to a comparable time period. To prevent fading, the threshold values of maximum shutdown of the display would be set to 150–200 ms maximum deactivation time and 150–200 ms maximum time since last service cycle.

If the peripheral device to which service is interrupted is the keyboard (227), then the switching device deactivated is the serial clock. Without the serial clock, the deactivated peripheral device simply enters a wait state with varying effects.

In the case of the keyboard, delays of transmission of greater than 200 ms produce noticeable delays in the response of the computer. To prevent objectionable delays, the threshold values of maximum shutdown time, and time since last servicing, would be set to less than 200 ms, however longer delays are tolerable if a message is being received.

Following deactivation of switching devices of peripherals, the controller (215) compares a deactivation time of each peripheral against a corresponding threshold value. Where a deactivation period of a peripheral exceeds a threshold value, the controller may re-initiate service to that peripheral. Service to other peripherals that have not exceeded any appropriate threshold value will continue to be deferred.

Deactivation of devices may be staged based on necessity or need. Where service to a peripheral (power supply (211)) is perceived to be crucial, service may be maintained to that peripheral while service to other peripherals is interrupted. Where a battery (209) charge level is deemed critical other peripheral devices, such as the display (223) keyboard (227), etc., may be deactivated simultaneously or sequentially. Where sequential operation is chosen, the keyboard (227) may, for example, be deactivated first, followed by the display (223) and so on.

Figure 3:
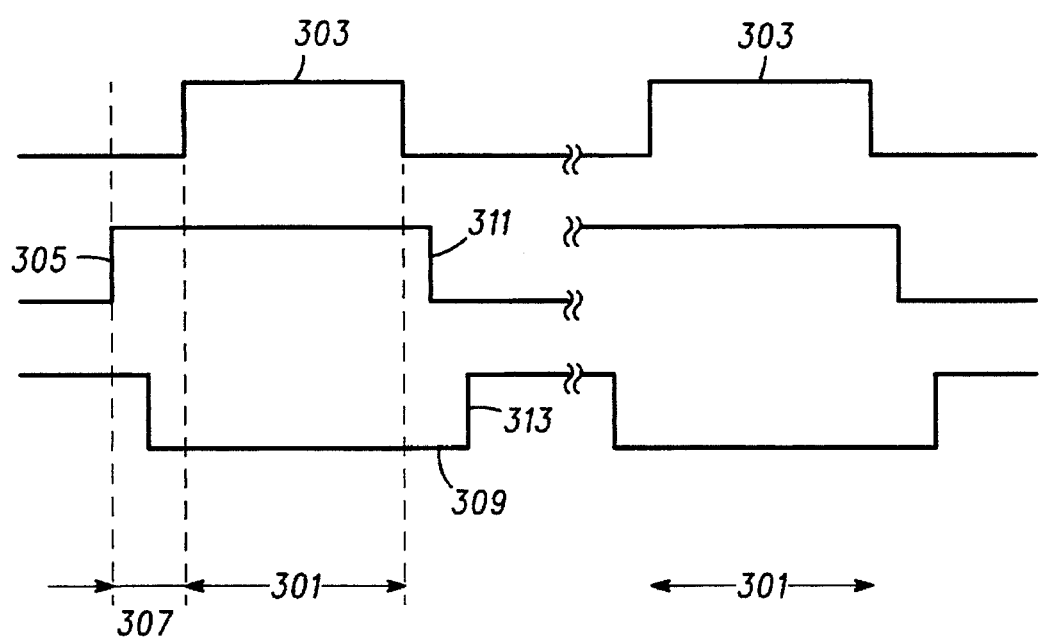
FIG. 3 is a timing diagram in accordance with an embodiment of the instant invention.

With further reference to the FIG. 3 timing diagram a more detailed description of one preferred embodiment in accordance with the instant invention will be discussed. The subscriber terminal (104) operating in the communications system (100) includes the radio frequency transceiver (102) that is arranged to receive communications from the infrastructure during an active time period (301); and the computer or portable computing device (105) that is operably coupled at interface (117) to the radio frequency transceiver and further arranged to forego various desense generating activities during the active time period.

The subscriber terminal (104) further includes the controller (103) for facilitating a determination of the active time period (301) which determination of the active time period includes, for example an active portion (303) of a power save protocol or may include a prescribed time period after a transmission from the subscriber terminal (104) when a response is anticipated. The controller further provides an active signal (305) to the portable computing device (105) at interface (117) during the active time period (301) and as shown in FIG. 3 for a small preceding time (307).

The small preceding time (307), on the order of 10 milliseconds is sufficient to allow the controller (215) to detect the active signal (305) and, responsive thereto to deactivate or forego further desensitization generating activities as depicted by signal (309). Subsequent to the active time period (301) the active signal goes low (311) and the computer (105) may reactivate the desense generating activities (313). If, as may often be the case with some protocols, no messages will be provided to the subscriber terminal during a particular active time period as determined by receiving at the beginning of the time slot, from the infrastructure, a list of terminals for which messages will be sent this time period, the portable computing device can be deactivated only during this subsequently determined active portion of the active time period and reactivated after this subsequently determined active portion of the active time period. As noted above foregoing desense generating activities may include disabling a power supply for at least a portion of the active time period, disabling a display for at least a portion of the active time period, disabling a processor clock for at least a portion of the active time period, or some combination thereof.

Figure 4:
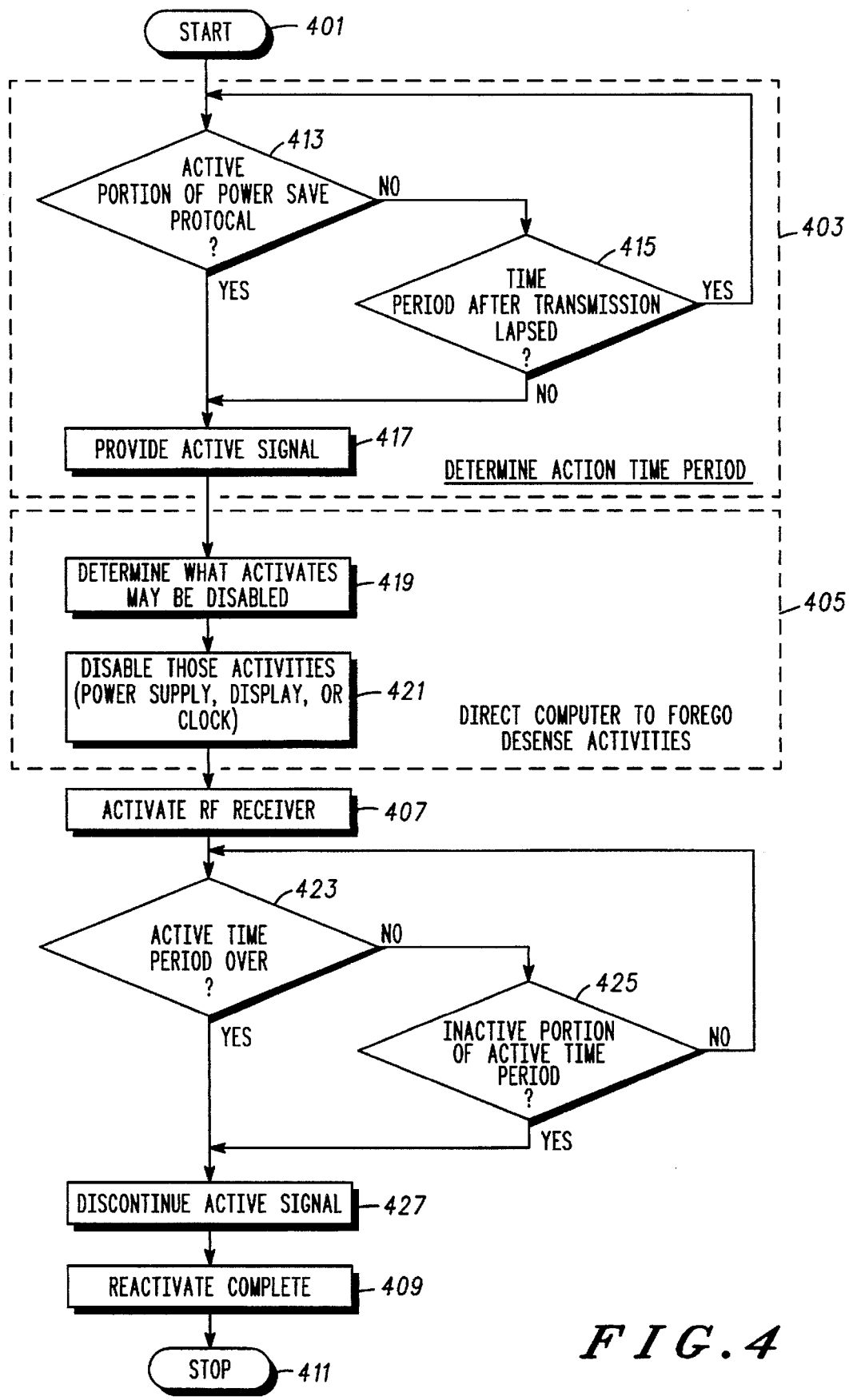
FIG. 4 is a preferred method embodiment in accordance with the instant invention.

Referring to FIG. 4, a method embodiment in accordance with the instant invention will be described. Generally the FIG. 4 method is set in a wireless communications system having an infrastructure and subscriber terminals. The wireless communications system is arranged and constructed to provide data communications between the infrastructure and the subscriber terminals. The subscriber terminals include a computer that is operatively coupled to a radio frequency (RF) receiver. The method provides a way of advantageously avoiding desensitization of the radio frequency receiver due to interfering noise generated by the computer. The method starts at step (401) and initially determines an active time period for the RF receiver at step (403). This determination includes utilizing an active portion of a power save protocol or a prescribed time period after a transmission from the subscriber terminal.

Step (403) asks if the active portion of a power save protocol is present at step (413) and if not whether a prescribed time period after a transmission from the subscriber terminal has lapsed at step (415). If the time period has lapsed the process returns to the beginning of step (403). If the result of step (413) is positive or the prescribed time period has not lapsed at step (415) an active signal is provided at step (417) and the method proceeds to step (405).

At step (405), responsive for example, to the active signal, the computer is directed to forego desense generating activities, such as disabling a switching power supply, disabling a display, or disabling a processor clock for the computer. Initially at step (419) a determination of what activities may be disabled is undertaken and then at step (421) those activities are disabled or inactivated.

Thereafter at step (407) the RF receiver is activated for the duration of the active time period as tested at step (423) or for an active portion thereof as tested at step (425). If the active time period is not over and the receiver remains active the process loops back to step (423). If either the active time period has expired, step (423), or an inactive portion of the active time period is present, step (425), the active signal is discontinued at step (427). and reactivation of the computer, specifically the desense generating activities of the computer, is accomplished at step (409) and the process is finished at step (411).

It will be appreciated by those of ordinary skill in the art that the apparatus and methods disclosed provide various advantageous techniques of avoiding desensitization of a radio frequency receiver operating in conjunction with a computer as a subscriber terminal in a data communications system. Hence, the present invention, in furtherance of satisfying a long-felt and growing (given the proliferation of data systems and associated computer or computer like devices) need for improved approaches for avoiding desensitization problems without the alternative burden of providing excessive shielding systems.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a wireless communications system having an infrastructure and subscriber terminals and arranged and constructed to provide data communications between the infrastructure and the subscriber terminals, the subscriber terminals including a computer operatively coupled to a radio frequency (RF) receiver, a method of avoiding desensitization of the radio frequency receiver by the computer including the steps of:

determining an active time period for the RF receiver, where the active time period is predetermined according to a communications protocol;

directing the computer to forego desense generating activities during at least a portion of said active time period, including disabling a display for the computer during at least said portion of said active time period; and activating said RF receiver during said active time period.

2. The method of claim 1 further including a step of reactivating the computer after said active time period.

3. The method of claim 2 wherein said step of reactivating said computer occurs during a subsequently determined inactive portion of said active time period.

4. The method of claim 1 wherein said step of determining an active time period includes utilizing an active portion of a power save protocol.

5. The method of claim 1 wherein said step of determining an active time period includes utilizing a prescribed time period after a transmission from the subscriber terminal.

6. The method of claim 1 wherein said step of directing the computer to forego desense generating activities includes disabling a power supply for the computer.

7. The method of claim 1 wherein said step of disabling a display for the computer includes stopping sending of switching commands to a display driver for the display.

8. The method of claim 1 wherein said step of directing the computer to forego desense generating activities includes modifying a processor clock.

9. A subscriber terminal operable in a wireless communications system having an infrastructure and arranged and constructed to provide data communications between the infrastructure and the subscriber terminal, the subscriber terminal comprising in combination:

a radio frequency receiver arranged to receive communications from the infrastructure during an active time period that is predetermined according to a communications protocol;

a display; and a portable computing device operatively coupled to the radio frequency receiver and the display and arranged to disable the display during at least a portion of said active time period.

10. The subscriber terminal of claim 9 wherein said radio frequency receiver further includes a controller for determining said active time period.

11. The subscriber terminal of claim 10 wherein said controller further includes an active portion of a power save protocol in determining an active time period.

12. The subscriber terminal of claim 10 wherein said controller further includes a prescribed time period after a transmission from the subscriber terminal in determining an active time period.

13. The subscriber terminal of claim 10 wherein said controller further provides an active signal to said portable computing device during said active time period.

14. The subscriber terminal of claim 9 wherein said portable computing device disables the display in response to said active signal.

15. The subscriber terminal of claim 14 wherein said portable computing device is deactivated during said active time period and reactivated after said active time period.

16. The subscriber terminal of claim 15 wherein said portable computing device is deactivated during a subsequently determined active portion of said active time period and reactivated after said subsequently determined active portion of said active time period.

17. The subscriber terminal of claim 14 wherein said portable computing device disables a power supply for at least a portion of said active time period.

18. The subscriber terminal of claim 14 further comprising:

a display driver for driving the display; and a controller for sending switching commands to the display driver, wherein the controller stops sending switching commands to the display driver for at least said portion of said active time period.

19. The subscriber terminal of claim 18, wherein the controller stops sending switching commands to the display driver for no more than 200 milliseconds during said active time period.

20. The subscriber terminal of claim 14 wherein said portable computing device modifies a processor clock for at least a portion of said active time period.

* * * * *